(12) United States Patent
Oikawa

(10) Patent No.: US 8,780,252 B2
(45) Date of Patent: Jul. 15, 2014

(54) IMAGING APPARATUS

(75) Inventor: Ryo Oikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 13/466,501

(22) Filed: May 8, 2012

(65) Prior Publication Data

US 2012/0287325 A1 Nov. 15, 2012

(30) Foreign Application Priority Data

May 13, 2011 (JP) .................. 2011-107760

(51) Int. Cl.
*H04N 5/222* (2006.01)
*H04N 5/76* (2006.01)
*H04N 9/80* (2006.01)

(52) U.S. Cl.
USPC ............. 348/333.02; 348/231.5; 348/231.3; 348/333.01; 386/239; 386/241

(58) Field of Classification Search
CPC ............. H04N 5/23293; H04N 5/232; H04N 5/23212; H04N 1/2145; H04N 21/4122; H04N 21/4305; H04N 5/765; H04N 21/8547; G03B 13/00; G11B 27/3036
USPC .............. 348/333.01–333.13, 231.5, 231.3; 386/224–230, 239–241
See application file for complete search history.

(56) References Cited

U.S. PATENT DOCUMENTS

| | | | |
|---|---|---|---|
| 5,182,677 A * | 1/1993 | Kizu et al. ................ | 386/281 |
| 7,024,097 B2 * | 4/2006 | Sullivan ................... | 386/241 |
| 7,142,775 B2 * | 11/2006 | Sullivan ................... | 386/207 |
| 7,167,633 B2 * | 1/2007 | Sullivan ................... | 386/207 |
| 7,171,107 B2 * | 1/2007 | Sullivan ................... | 386/207 |
| 7,248,779 B2 * | 7/2007 | Sullivan ................... | 386/207 |
| 7,428,013 B2 * | 9/2008 | Tsukagoshi et al. ........ | 348/249 |
| 7,639,280 B2 * | 12/2009 | Nagao ..................... | 348/220.1 |
| 8,331,757 B2 * | 12/2012 | Abe ........................ | 386/232 |
| 8,364,012 B2 * | 1/2013 | Hio ......................... | 386/239 |
| 8,542,305 B2 * | 9/2013 | Iwamoto .................. | 348/333.01 |
| 2004/0174451 A1 * | 9/2004 | Okazaki et al. .......... | 348/333.02 |
| 2004/0247284 A1 * | 12/2004 | Yamasaki ................. | 386/52 |
| 2006/0033831 A1 * | 2/2006 | Ejima et al. ............. | 348/333.01 |
| 2007/0177854 A1 * | 8/2007 | Ando et al. .............. | 386/126 |
| 2007/0180466 A1 * | 8/2007 | Ando et al. .............. | 725/37 |
| 2008/0165268 A1 * | 7/2008 | Takahashi et al. ........ | 348/333.01 |

(Continued)

FOREIGN PATENT DOCUMENTS

JP 10-247377 A 9/1998

*Primary Examiner* — Chia-Wei A Chen
(74) *Attorney, Agent, or Firm* — Canon USA Inc. IP Division

(57) ABSTRACT

An imaging apparatus includes an imaging unit, a measurement unit that measures a current time, a counter, an acquisition unit that acquires a first value from the measurement unit at setting of an initial value, and a first difference between a value of the counter at measurement timing of the measurement unit and a value of the counter at the setting of the initial value, a generation unit that acquires a second value of the measurement unit at starting display, and a second difference between a value of the counter at measurement timing of the measurement unit and a value of the counter at the starting display, and to generate a time code concerning an elapsed time from the initial value, based on the initial value, the first value, the first difference, the second value and the second difference, and an output unit that outputs the time code.

18 Claims, 7 Drawing Sheets

(56) References Cited

U.S. PATENT DOCUMENTS

| | | | |
|---|---|---|---|
| 2008/0266239 A1* | 10/2008 | Iwamoto | 345/102 |
| 2009/0304348 A1* | 12/2009 | Hio | 386/52 |
| 2010/0177211 A1* | 7/2010 | Nakase et al. | 348/231.2 |
| 2010/0278509 A1* | 11/2010 | Nagano et al. | 386/230 |
| 2011/0033172 A1* | 2/2011 | Ando et al. | 386/355 |
| 2011/0058085 A1* | 3/2011 | Ito et al. | 348/333.02 |
| 2013/0121662 A1* | 5/2013 | Moorer | 386/240 |

* cited by examiner

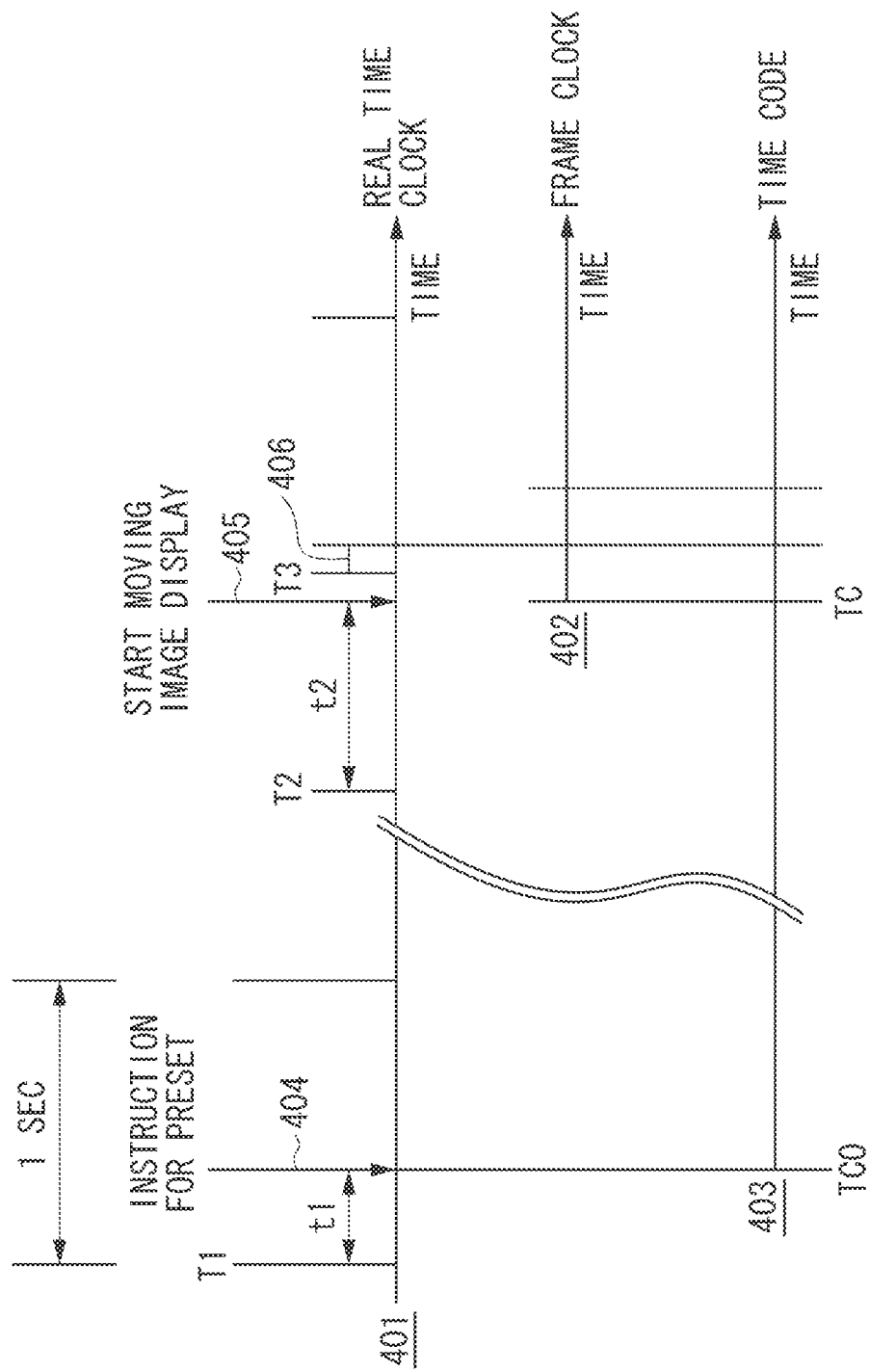

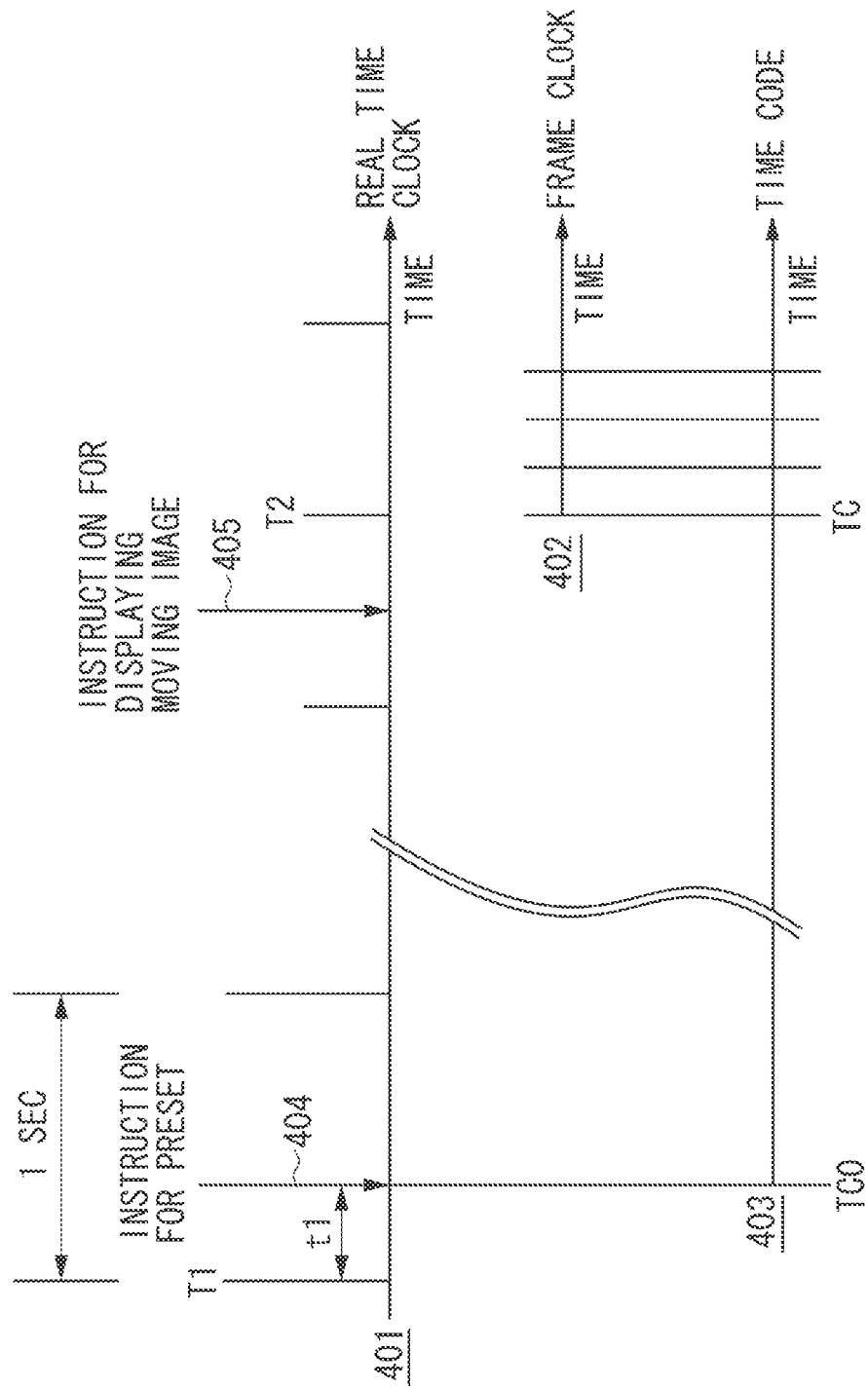

IMAGING APPARATUS

BACKGROUND OF THE INVENTION

1. Field of the Invention

The present invention relates to an imaging apparatus, and particularly, relates to processing of a time code related to moving image data.

2. Description of the Related Art

Among imaging apparatuses that capture a moving image, there is an imaging apparatus having a function of adding a time code representing a current date-and-time or the like to the captured moving image. For example, Japanese Patent Application Laid-Open No. 10-247377 discusses the technique in which the imaging apparatus incorporates a clock (real-time clock: RTC) which measures the current date-and-time, and generates a time code using an output of this RTC. Further, the RTC is generally designed to operate with a battery separate from a main power source, and be able to continue time measurement operation, even while the main power source of the apparatus is off.

Further, there is known an imaging apparatus having a function of measuring an elapsed time or a number of frames of the moving image from recording start, or an elapsed time from a point in time which a user has designated, and recording or displaying these times as the time code. The time code representing the elapsed time from the point in time which the user has designated is called a free run time code.

To generate the free run time code, a high-precision time measurement device that can measure time with frame precision of moving image signals becomes necessary, in addition to the RTC that measures the current date-and-time. However, separately providing such a time measurement device leads to cost increase of the apparatus.

SUMMARY OF THE INVENTION

The present invention is to provide an imaging apparatus capable of generating a time code representing an elapsed time, without having a dedicated time measurement hardware.

According to an aspect of the present invention, an imaging apparatus includes an imaging unit configured to output a moving image signal, a time measurement unit configured to measure a current time, a counter that counts a clock, an acquisition unit configured, in response to setting of an initial value of a time code, to acquire a first value from the time measurement unit at a setting timing of the initial value, and a first difference value that is a difference between a value of the counter at a measurement timing of the time measurement unit and a value of the counter at the setting timing of the initial value, a generation unit configured, in response to an instruction for starting a display of the moving image signal, to acquire a second value of the time measurement unit at an instruction timing of the starting display, and a second difference value that is a difference between a value of the counter at the measurement timing of the time measurement unit and a value of the counter at the instruction timing of the starting display, and to generate a time code concerning an elapsed time from the initial value including a number of frames, based on the initial value, the first value, the first difference value, the second value and the second difference value, and an output unit configured to output the time code together with the moving image concerning the moving image signal to a display device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A and 6B are schematic diagrams illustrating the way of generation processing of the time code according to a second exemplary embodiment.

DESCRIPTION OF THE EMBODIMENTS

Various exemplary embodiments, features, and aspects of the invention will be described in detail below with reference to the drawings.

Figure 1:
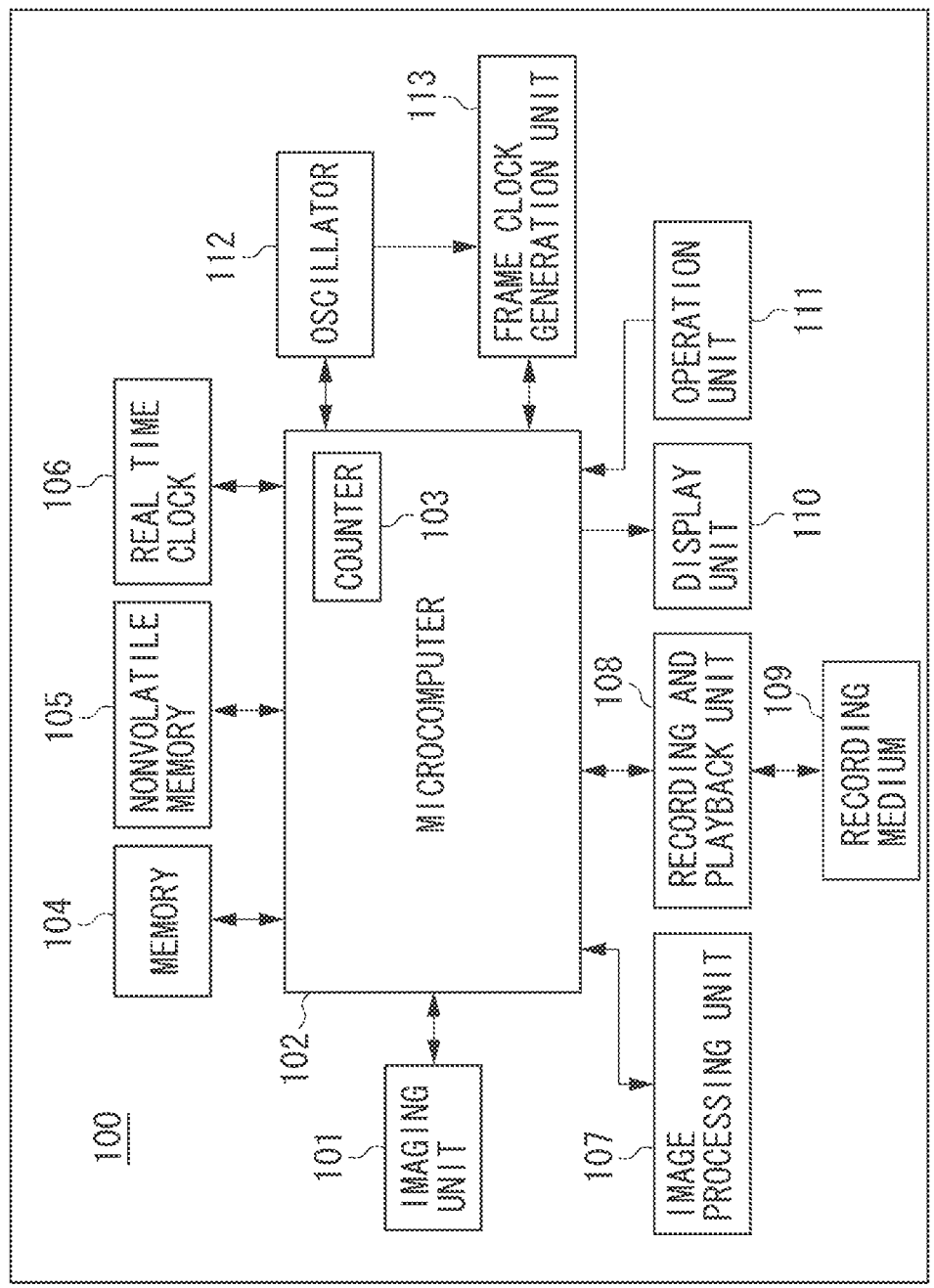
FIG. 1 is a schematic configuration block diagram according to a first exemplary embodiment of the present invention.

FIG. 1 is a schematic configuration block diagram of an imaging apparatus according to a first exemplary embodiment of the present invention. In an imaging apparatus 100, an imaging unit 101 includes optical members such as a lens, an image sensor such as a charge-coupled device (CCD), an analog-to-digital (AD) converter and a signal processing circuit, and captures an object to generate moving image signals. The imaging unit 101 generates the moving image signals at a specified frame rate according to a frame clock from a microcomputer 102, and outputs the moving image signals to the microcomputer 102. The microcomputer 102 controls respective units of the imaging apparatus 100 according to a program (software) stored in a nonvolatile memory 105. Further, the microcomputer 102 incorporates a counter 103 that counts a system clock from an oscillator 112, and controls an operation timing of the respective units according to a count value of the counter 103. The counter 103 is a free running counter, and when it counts up the system clock to a predetermined value n, self-resets the count value to an initial value.

A memory 104 stores therein the moving image signals and information necessary for various types of processing performed by the microcomputer 102. The memory 104 is a volatile memory such as a dynamic random-access memory (DRAM). A nonvolatile memory 105 stores therein an operation program for the microcomputer 102 and various necessary information. A real-time clock (RTC) 106 measures a current date-and-time (day, hour, minute and second) by seconds. The RTC 106 is provided with a battery serving as a power source for operating the RTC 106, in addition to a main power source of the imaging apparatus 100. Therefore, the RTC 106 continues time measurement operation, even while the main power source of the imaging apparatus 100 is off.

An image processing unit 107 compresses the moving image signals obtained by the imaging unit 101 by subjecting the moving image signals to a publicly known coding process or the like during recording. The image processing unit 107 decompresses the moving image signals (compressed data) played back from a recording medium, during playback. A recording and playback unit 108 adds various types of additional information to compressed moving image signals from the image processing unit 107 during the recording to convert them into a format suitable for the recording, and records the moving image signals on the recording medium 109. The recording and playback unit 108 reads out the compressed moving image signals from the recording medium 109 during the playback, and supplies the compressed moving image signals to the image processing unit 107. The recording medium 109 is a random-access recording medium such as a memory card incorporating a flash memory. Further, the moving image signals recorded on the recording medium 109 are managed as a file. Further, the moving image signals recorded in an interval between a recording start instruction and a recording stop instruction are managed as one moving image file.

A display unit 110 includes a display device such as a liquid crystal panel, and displays the image represented by the moving image signals obtained by the imaging unit 101, during image capturing. The display unit 110 displays played-back image represented by the moving image signals played back from the recording medium 109, during the playback. Further, the display unit 110 displays various types of information such as menu information, in response to an instruction of the microcomputer 102.

An operation unit 111 is provided with a power switch, a switch for giving instruction for imaging start and recording stop, and various types of switches necessary for inputting instructions by the user using a menu screen. The user can input necessary instruction into the imaging apparatus 100, by operating the operation unit 111.

An oscillator 112 includes a crystal oscillator or the like, and generates a system clock with a high-frequency in the order of several tens to 100 MHz. The system clock generated from the oscillator 112 is input into the microcomputer 102 and a frame clock generation unit 113. The frame clock generation unit 113 includes a frequency divider or the like, and generates a frame clock with a frequency corresponding to the specified frame rate, from the system clock generated from the oscillator 112, outputs the frame clock to the microcomputer 102. For example, when a frame rate of the moving images from the imaging unit 101 is 29.97 frames per second (fps) corresponding to National Television System Committee (NTSC) process, the frame clock generation unit 113 generates a frame clock with intervals of 33.37 milliseconds (ms).

The processing during imaging will be described. In response to the user having turned on the power of the imaging apparatus 100 by the operation unit 111, the microcomputer 102 sets up the imaging apparatus 100 to an imaging mode, and the imaging apparatus 100 operates in a imaging standby state as follows. Specifically, the microcomputer 102 outputs the frame clock from the frame clock generation unit 113 to the imaging unit 101, and controls the imaging unit 101 such that it generates the moving image at the specified frame rate. The imaging unit 101 generates the moving image signals according to the frame clock, and sends the moving image signals to the microcomputer 102. The microcomputer 102 temporarily stores the moving image signals sent from the imaging unit 101 in the memory 104. The microcomputer 102 converts a screen size of the moving images stored in the memory 104 into a size corresponding to a display screen size of the display unit 110, and sends the moving image to the display unit 110. The display unit 110 displays the image represented by the moving image signals sent from the microcomputer 102.

In this manner, in the imaging standby state, the moving image of the moving image signals captured by the imaging unit 101 are displayed on the display unit 110. Further, the microcomputer 102 generates time code data as described below, in the imaging standby state, and sends the data to the display unit 110. The display unit 110 displays the moving image from the imaging unit 101 and the time code in a superimposed manner.

If there are no instructions for imaging start during a predetermined period of time, after getting into the imaging standby state, the microcomputer 102 stops capturing of the moving images by the imaging unit 101 and displaying. Thereafter, the operation unit 111 is operated, once again. Then, the microcomputer 102 causes the imaging unit 101 to resumes capturing the moving images, and causes the display unit 110 to resume displaying the moving images.

In response to the user having given an instruction for imaging start by operating the operation unit 111, in the imaging standby state, the microcomputer 102 controls respective units to start recording of the moving image signals. The microcomputer 102 outputs the moving image signals stored in the memory 104 to the image processing unit 107 and instructs the image processing unit 107 to start coding, in response to the recording start instruction. The image processing unit 107 sequentially encodes the moving image signals, and outputs the encoded moving image signals, in other words, compressed moving image signals to the microcomputer 102. The microcomputer 102 temporarily stores the encoded moving image signals in the memory 104, and reads out the moving image signals from the memory 104 at a determined timing and sends the moving image signals to the recording and playback unit 108. Then, the microcomputer 102 instructs the recording and playback unit 108 to start the recording of the moving images. Further, the microcomputer 102 adds the free run time code to respective frames of the moving image signals which should be recorded, and also adds date-and-time information indicating current date-and-time for each frame based on an output of the RTC 106. The recording and playback unit 108 records the moving image signals (compressed moving image signals) added with the time code and date-and-time information in this manner on the recording medium 109.

In response to having received an instruction for an imaging stop from the operation unit 111, after the recording of the moving images has been thus started, the microcomputer 102 controls the respective units to stop the moving image recording and to shift to the imaging standby state. Specifically, the recording and playback unit 108 stops the moving image recording onto the recording medium 109, and the image processing unit 107 stops coding process of the moving image signals.

The processing performed during the playback will be described. When the user operates the operation unit 111 to input a switching instruction to the playback mode, the microcomputer 102 sets the imaging apparatus 100 to the playback mode. Then, the microcomputer 102 instructs the recording and playback unit 108 to play back the moving image signals designated by the user from the recording medium 109. The recording and playback unit 108 reads out the moving image signals (compressed moving image signals) from the recording medium 109, and outputs the moving image signals to the microcomputer 102. The microcomputer 102 temporarily stores played-back moving image signals on the memory 104. Then, the microcomputer 102 reads out the moving image signals into the image processing unit 107 from the memory 104, and instructs the image processing unit 107 to decompress the moving image signals. The image processing unit 107 decompresses the moving image signals from the memory 104, and sends the moving image signals to the memory 104. The microcomputer 102 temporarily stores the decompressed played-back moving image signals on the memory 104, and sequentially reads out the decompressed played-back moving image signals from the memory 104 and sends thereof to the display unit 110. The display unit 110 performs image display of the played-back moving image signals from the microcomputer 102.

Further, the microcomputer 102 detects the free run time code and date-and-time information added to the played-back moving image signals. The user can instruct the microcomputer 102 whether display of the time code and display of the date-and-time information are necessary individually, from the operation unit 111. The microcomputer 102 sends the time code or date-and-time information of the played-back moving image signals to the display unit 110, according to such an instruction, and displays them superimposed on the played-back moving images.

The microcomputer 102 instructs the recording and playback unit 108 to stop moving image playback, according to playback stop instruction of the operation unit 111. The recording and playback unit 108 stops playback of the moving image signals from the recording medium 109, according to the instruction.

The processing of the time code will be described. In the present exemplary embodiment, the user can set (preset) an initial value of the time code. When the user presets the initial value of the time code and subsequently gives instruction for starting, the microcomputer 102 starts counting of the time code from the set initial value. After the user has preset the time code, even after the user temporarily turns off the power of the imaging apparatus 100, and once again turns on the power, an elapsed time from the time of preset is measured as a value of the time code. The user can arbitrarily set whether to display the time code on the display unit 110 during the imaging standby state or during the recording of the moving images, by operating the operation unit 111. Even when the user has set non-display of the time code, the microcomputer 102 continues measurement of the time code.

After changed from the imaging mode to the playback mode, when once again set to the imaging mode, the microcomputer 102 determines an elapsed time from the time when preset as described below, and calculates a value of the time code.

Figure 2:
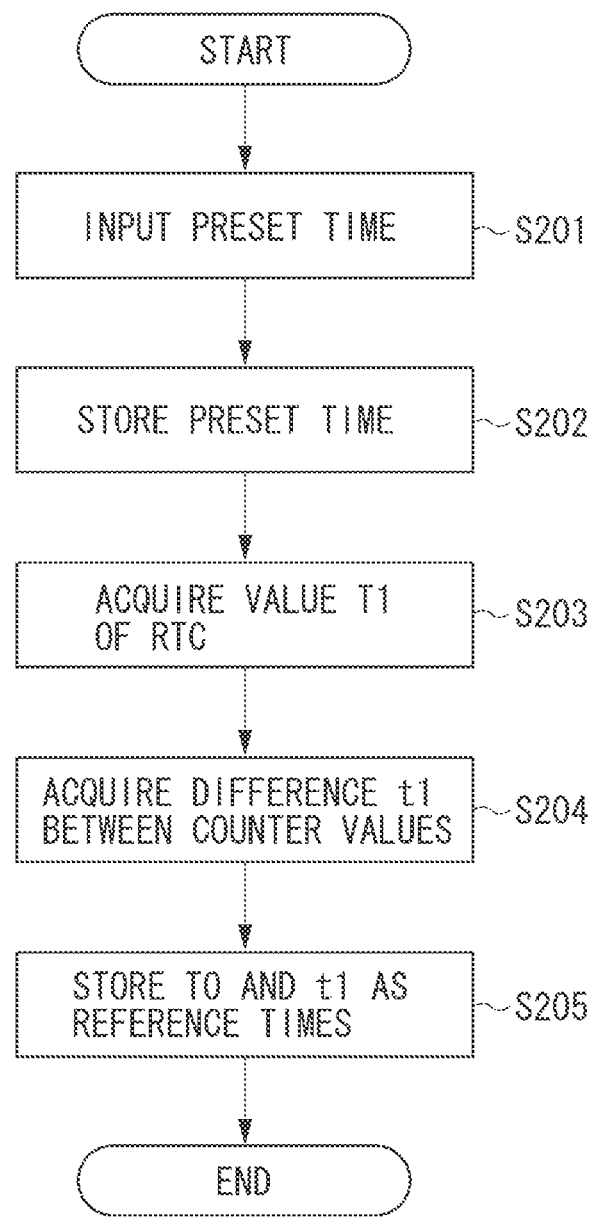
FIG. 2 is a flowchart illustrating preset processing of a time code according to the present exemplary embodiment.

Setting processing of a reference time involved in preset processing of the time code will be described. FIG. 2 is a flowchart illustrating the setting processing of the reference time involved in the preset processing of the time code. The processing illustrated in FIG. 2 is executed by the microcomputer 102.

In response to the user having given an instruction for the preset processing of the time code, by operating the operation unit 111, the microcomputer 102 displays a setting screen for presetting on the display unit 110. In step S201, the user sets an arbitrary value as a time code, by operating the operation unit 111. In this case, the user can set arbitrary hour, minute, second and number of frames. An upper limit value of the number of frames varies depending on a frame rate of the moving images. For example, if the frame rate is 29.97 fps, the user can set an arbitrary value from 0 to 29 as a frame initial value. If the user sets an initial time code value, in step S202, the microcomputer 102 stores the set hour, minute, second and a value of the number of frames on the nonvolatile memory 105.

Next, in step S203, the microcomputer 102 acquires a value T1 (first value) of the current date-and-time output from the RTC 106 at a point in time when the user has set the initial value. The microcomputer 102 takes in a value of the counter 103 each time the value of the RTC 106 gains one-second, based on the date-and-time information from the RTC 106, and stores it on the memory 104. In other words, the microcomputer 102 stores a count value of the counter 103 on the memory 104, in synchronization with time measurement timing or update of the RTC 106. Then, in step S204, the microcomputer 102 acquires a difference t1 (first difference value) between a count value of the counter 103 corresponding to a timing at which the user has set the initial value, and a count value of the counter 103 stored on the memory 104 in synchronization with update of the RTC 106. In step S205, the microcomputer 102 stores values of T1 and t1 on the nonvolatile memory 105 as reference time information.

A difference value t1, in a sense, is a correction value for measuring a time-of-day in seconds by the RTC 106 in a finer unit than in seconds. T1+t1 represents a value of the time-of-day at the point of initial value setting, based on a unit less than seconds, more specifically, based on a unit of one cycle of a clock which the counter 103 counts. In this sense, the microcomputer 102 stores t1 converted into a scale of time-of-day display, rather than in a unit of a number of clocks supplied to the counter 103.

Figure 3:
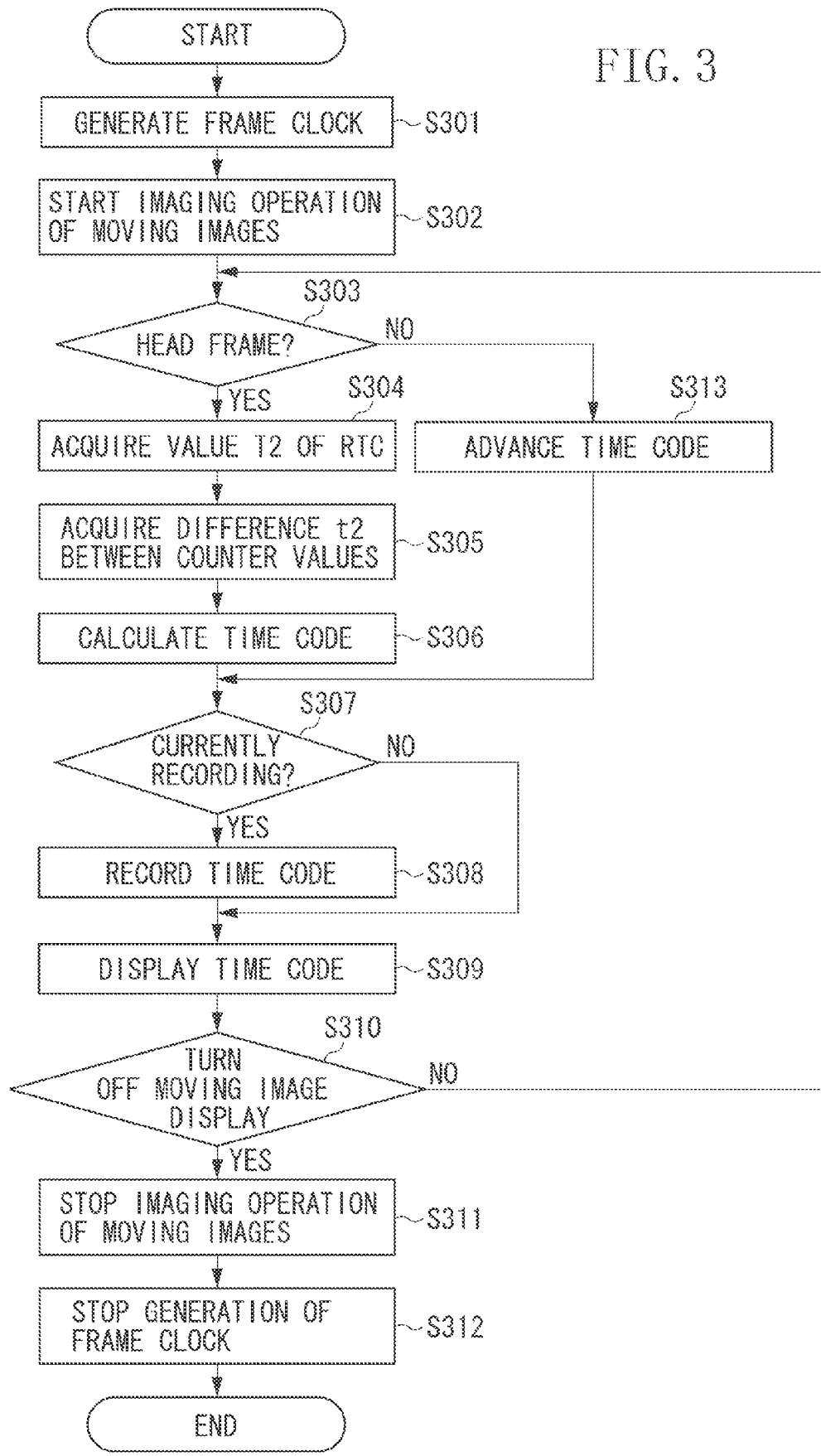
FIG. 3 is a flowchart illustrating generation processing of the time code according to the present exemplary embodiment.

The processing of the time code in the imaging mode will be described. FIG. 3 is a flowchart illustrating the processing of the time code in the imaging mode. The processing in FIG. 3 is executed by the microcomputer 102. When the user turns the power on or gives instruction to display the captured moving images, or gives instruction to switch to the imaging mode by operating the operation unit 111, the processing illustrated in FIG. 3 is started.

The microcomputer 102 instructs the frame clock generation unit 113 to generate a frame clock. In step S301, the frame clock generation unit 113 generates the frame clock, in response to an instruction from the microcomputer 102, and sends the frame clock to the microcomputer 102. Next, in step S302, the microcomputer 102 outputs the frame clock to the imaging unit 101, and causes the imaging unit 101 to start imaging of the moving images.

In step S303, the microcomputer 102, after starting display of the moving images, determines whether the moving image is a head frame. If the moving image is a head frame (YES in step S303), in step S304, the microcomputer 102 acquires a current date-and-time T2 (second value) output from the RTC 106, at that point in time, namely, at an instruction timing of the starting of display. In step S305, the microcomputer 102 calculates a difference t2 (second difference value) between a value of the counter 103 at the point at which the moving image of the head frame has been captured by the imaging unit 101, and a count value of the counter 103 stored on the memory 104 immediately before and in synchronization with update of the RTC 106.

A difference value t2, similarly to t1, is also a correction value for measuring time-of-day in seconds by the RTC 106 in an unit finer than in seconds. T1+t1 represents a value of time-of-day at the point of the initial value setting, based on a unit less than seconds. Similarly to t1, the microcomputer 102 stores t2 converted into a scale of time-of-day display, rather than in a unit of the number of clocks supplied to the counter 103.

In step S306, the microcomputer 102 calculates a value TC of the time code, according to the following equation (1), based on an initial value of the time code T0, reference time T1 and t1 stored in the nonvolatile memory 105, and acquired T2 and t2.

$$TC=TC0+(T2+t2)-(T1+t1) \qquad (1)$$

A value of hour/minute/second is obtained from a difference between T2 and T1, and a number of frames is obtained from a difference between t2 and t1. In other words, an elapsed number of frames is obtained, by dividing the difference between t2 and t1 by a value of the counter 103 corresponding to a frame interval in the set frame rate. The microcomputer 102 stores the time code of the head frame thus calculated, on the memory 104. When t1 and t2 are stored in a scale of time-of-day display, it is only necessary to convert a value less than seconds of TC into the number of frames, after calculation of the equation (1), and take it as the time code.

On the other hand, if the moving image is not a head frame (NO in step S303), in step S313, the microcomputer 102 advances the value of the time code stored in the memory 104 by one frame, in synchronization with the frame clock from the frame clock generation unit 113. The microcomputer 102 stores the obtained time code value as a new time code on the memory 104.

In step S307, the microcomputer 102 determines whether a moving image is currently being recorded. If the moving image is being recorded (YES in step S307), in step S308, the microcomputer 102 adds the time code stored in the memory 104 to the moving image signals and records the time code. On the other hand, if the moving image is not being recorded (NO in step S307), in step S309, the microcomputer 102 outputs the time code stored in the memory 104 to the display unit 110, and displays the time code superimposed on the moving image.

In step S311, the microcomputer 102, in response to having received an instruction for stopping the moving image display, stops displaying of the moving image on the display unit 110 and stops capturing of the moving image by the imaging unit 101. But, if the moving image is being recorded, the microcomputer 102, even if the instruction for stopping the moving image display is received, does not stop capturing of the moving image by the imaging unit 101. And, the microcomputer 102, in case of having received an instruction for power-off, stopping of the moving image display, or switching to the playback mode by the user, stops the capturing of the moving image by the imaging unit 101 and stops the recording of the moving image. In step S312, the microcomputer 102 stops generation of the frame clock by the frame clock generation unit 113, and ends the processing illustrated in FIG. 3. When an instruction for starting the moving image display on the display unit 110 is received after the moving image display is stopped by the instruction for stopping the moving image display, the microcomputer performs again the operation of FIG. 3.

Figure 4:
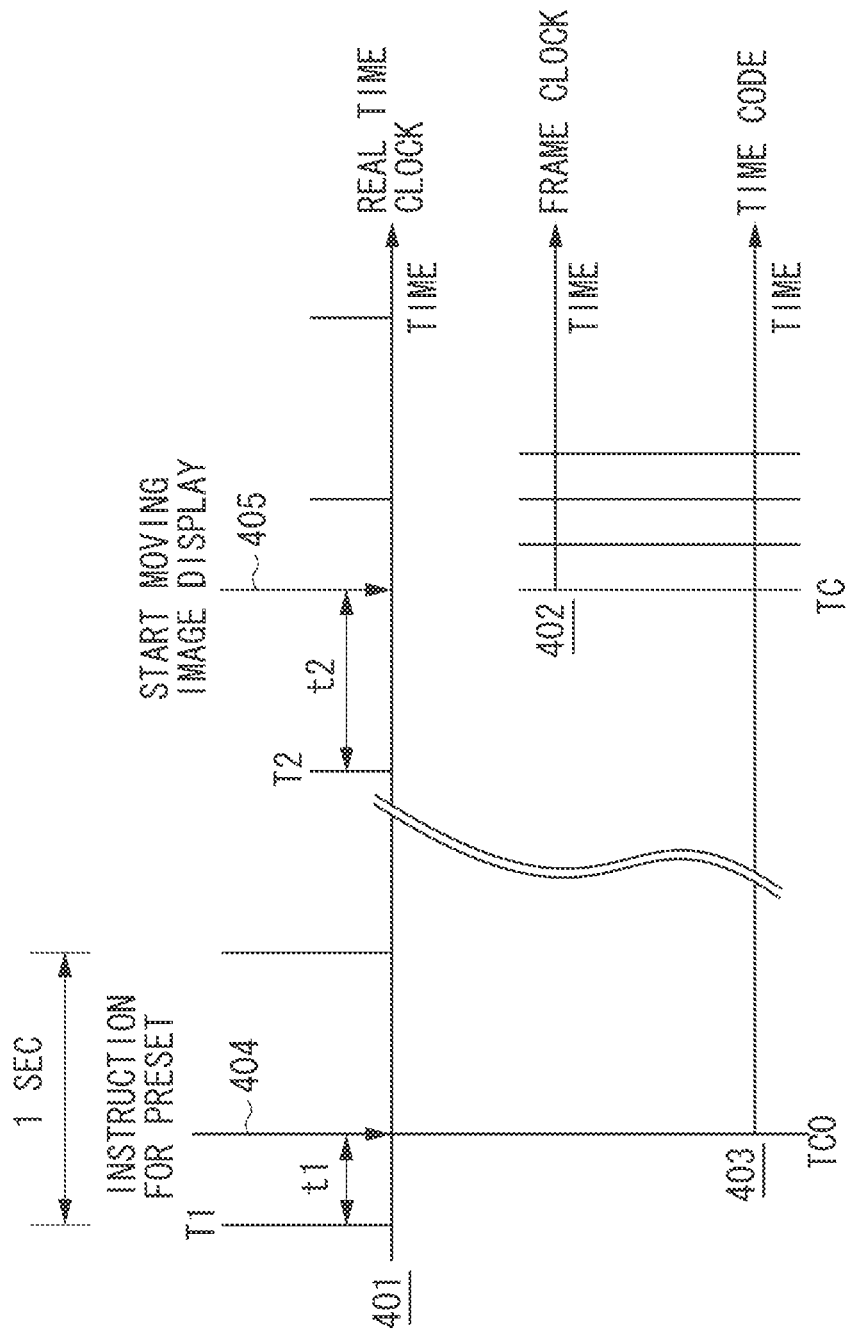
FIG. 4 is a schematic diagram illustrating the way of generation processing of the time code according to the present exemplary embodiment.

FIG. 4 is a schematic diagram illustrating the processing of the time code, when after the user has preset the time code, the user temporarily stops displaying of the captured moving image, and once again starts displaying of the captured moving image.

In FIG. 4, an output 401 of the RTC 106, a frame clock 402, and a time code 403 are illustrated. An output T1 of the RTC 106 at the time in point 404 when the time code has been preset by the user, and a difference t1 between a value of the counter 103 corresponding to the T1 and a value of the counter 103 at the time in point 404 are stored as reference times.

Thereafter, it is assumed that display of the moving image has been temporarily stopped, and once again, display of the captured moving image has been started at the time 405. The microcomputer 102 calculates an output T2 of the RTC 106 which has been output immediately before the start, and a difference t2 between a value of the counter 103 corresponding to the T2 and a value of the counter 103 at the time in point 405. Based on the values T2 and t2, the time code TC is obtained at the moving image display starting time 405. Thereafter, every time the frame clock is output, the time code is advanced by one frame relative to the TC value.

Figure 5:
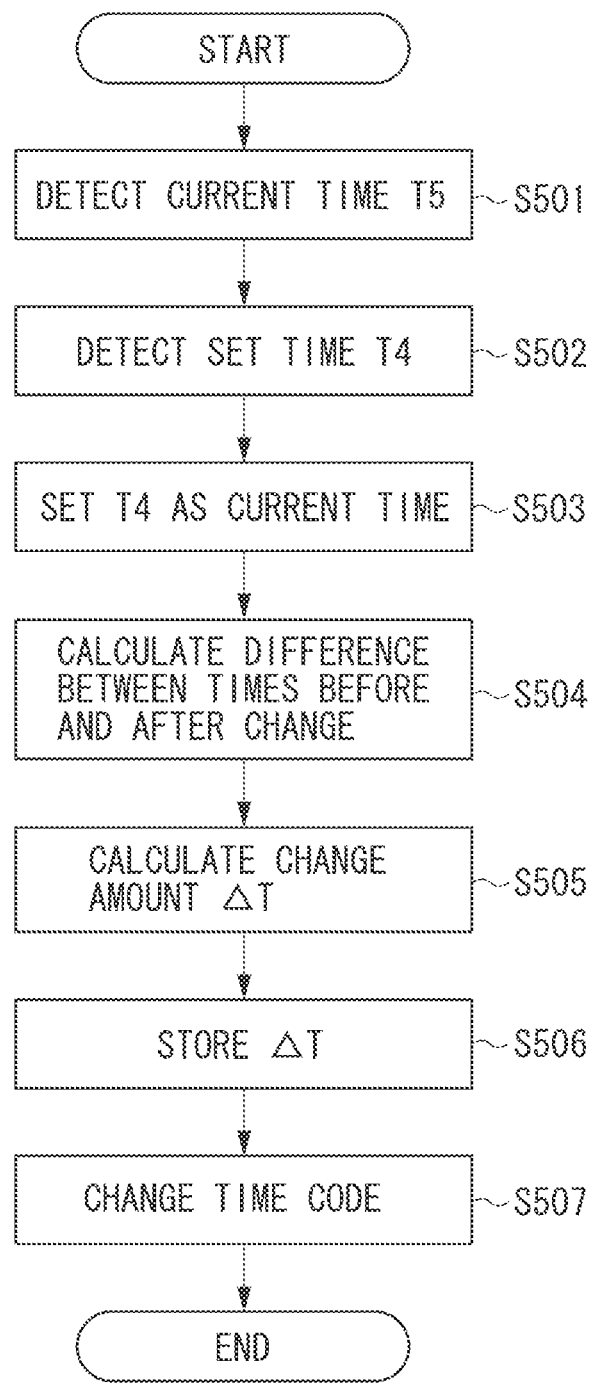
FIG. 5 is a flowchart illustrating change processing of a real time clock according to the present exemplary embodiment.

The processing when date-and-time of the RTC 106 is changed by the user will be described. FIG. 5 is a flowchart illustrating the processing when the date-and-time of the RTC 106 is changed. The processing in FIG. 5 is executed by the microcomputer 102.

In response to the user having instructed for change of the date-and-time of the RTC 106 by operating the operation unit 111, the microcomputer 102 displays a screen for changing a current date-and-time on the display unit 110. The user sets an arbitrary value as the current date-and-time by operating the operation unit 111. In the present exemplary embodiment, year/month/day/hour/minute/second can be set. When new date-and-time is set by the user, in step S501, the microcomputer 102 detects a value T5 of the RTC 106 immediately before the change. Further, in step S502, the microcomputer 102 detects a time T4 newly set. In step S503, the microcomputer 102 sets the newly set time T4 as the current date-and-time for the RTC 106. In step S504, the microcomputer 102 calculates a difference T4−T5 between before and after the change of the current date-and-time from the values of T4 and T5. In step S505, the microcomputer 102 calculates a change amount ΔT of the time code, based on the difference value T4−T5.

In the present exemplary embodiment, the microcomputer 102 calculates the change amount ΔT by accumulating the differences between before and after the changes, each time when a time of the RTC 106 is changed after the user has preset the time code. In other words, the microcomputer 102 sets 0 to ΔT, in response to the time code having been preset, and stores it on the nonvolatile memory 105. Thereafter, the microcomputer 102 adds the difference between before and after the change to ΔT stored on the nonvolatile memory 105 each time when the time of the RTC 106 is changed. Accordingly, ΔT represents a cumulative difference value.

In step S506, the microcomputer 102 stores the thus calculated ΔT on the nonvolatile memory 105. In step S507, the microcomputer 102 changes an initial value TC0 of the time code based on the ΔT. For example, the microcomputer 102 adds ΔT to a value TC of the current time code. On the other hand, if the moving image is not being currently displayed, the microcomputer 102 calculates the time code after adding ΔT to the initial value TC0 in step S306 in FIG. 3, when instruction for displaying the moving image is issued next.

In this manner, in the present exemplary embodiment, the microcomputer 102 generates a time code from the preset point in time, based on an output of the RTC 106 and a value of the counter 103 at the time of presetting, and an output of the RTC 106 and a value of the counter 103 at the time of starting of the moving image display. As a result, the microcomputer 102 can generate a time code from the preset point-in-time, without providing a high-precision real-time clock for generating a free run time code.

Another operation for generating the free run time code will be described. When a time code at the time of the starting of the moving image display is calculated, a number of frames may be calculated by dividing a difference between count values of the RTC 106 by a count value corresponding to the frame interval. In such a case, a deviation of the number of frames can develop. For example, when a count cycle in the RTC 106, in this case, an interval of one second does not become an integral multiple of an interval of the frame clock generated by the frame clock generation unit 113, and the number of frames is calculated, deviation equivalent to one-frame at maximum develops.

FIG. 6A illustrates the way in which deviation develops. In FIGS. 6A and 6B, the same reference numerals are designated to the same elements and points-in-time as those in FIG. 4. For example, after starting the moving image display at the point-in-time 405, a difference 406 is generated between a time code generated in synchronization with the frame clock, and the cycle timing T3 of the RTC 106.

In the present exemplary embodiment, as illustrated in FIG. 6B, the microcomputer 102 waits for the moving image display and the output of the time code, until next receiving the output from the RTC 106, after instruction for starting display of the moving image at the point-in-time 405. Thereafter, the microcomputer 102 generates a time code in synchronization with the frame clock.

Specific operation will be described. When the user operates the operation unit 111 and inputs an instruction for display start of the captured moving image, the microcomputer 102 waits for change of an output value of the RTC 106. When the output value of the RTC 106 is changed, the microcomputer 102 starts the processing illustrated in FIG. 3. In addition, T2 in FIG. 6B is a timing at which the RTC 106 reaches next count cycle, after receiving the instruction for starting the moving image display. Further, a difference t2 calculated by the processing in step S305 becomes zero.

In this manner, in the present exemplary embodiment, even when a count cycle of the RTC 106 and a cycle of the frame clock do not become an integral multiple, it is possible to eliminate a deviation of the time code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-107760 filed May 13, 2011, which is hereby incorporated by reference herein in its entirety.

What is claimed is:

1. An imaging apparatus comprising:
    an imaging unit configured to output a moving image signal;
    a time measurement unit configured to measure a current time;
    a counter that counts a clock;
    an acquisition unit configured, in response to setting of an initial value of a time code, to acquire a first value from the time measurement unit at a setting timing of the initial value, and a first difference value that is a difference between a value of the counter at a measurement timing of the time measurement unit and a value of the counter at the setting timing of the initial value;
    a generation unit configured, in response to an instruction for starting a display of the moving image signal, to acquire a second value of the time measurement unit at an instruction timing of the starting display, and a second difference value that is a difference between a value of the counter at the measurement timing of the time measurement unit and a value of the counter at the instruction timing of the starting display, and to generate a time code concerning an elapsed time from the initial value including a number of frames, based on the initial value, the first value, the first difference value, the second value, and the second difference value; and
    an output unit configured to output the time code together with a moving image concerning the moving image signal to a display device.

2. The imaging apparatus according to claim 1, wherein the generation unit changes the time code according to a cycle of a frame rate of the moving image signal.

3. The imaging apparatus according to claim 1, further comprising:
    a control unit configured to control an operation of the imaging apparatus in response to a value of the counter.

4. The imaging apparatus according to claim 1, further comprising:
    a unit for generating a frame clock concerning a cycle of a frame rate of the moving image signal based on the clock.

5. The imaging apparatus according to claim 1, wherein the generation unit is configured, in response to a change of a value measured by the time measurement unit, to change the elapsed time.

6. The imaging apparatus according to claim 1, wherein the generation unit is configured to calculate a number of elapsed frames, based on a difference between the first difference and the second difference, and a value of the counter corresponding to a cycle of a frame rate of the moving image signal.

7. The imaging apparatus according to claim 1, further comprising:
    a setting unit configured to set the initial value of the time code in accordance with an operation from a user.

8. The imaging apparatus according to claim 1, wherein the time measurement unit executes a time measurement operation in a power-off state of the imaging apparatus.

9. The imaging apparatus according to claim 1, wherein the generation unit acquires the second difference value that is a difference between a value of the counter at the measurement timing of the time measurement unit immediately before the instruction timing of the starting display and a value of the counter at the instruction timing of the starting display.

10. An imaging apparatus comprising:
    an imaging unit configured to output a moving image signal;
    a time measurement unit configured to measure a current time;
    a counter that counts a clock;
    an acquisition unit configured, in response to setting of an initial value of a time code, to acquire a first value from the time measurement unit at a setting timing of the initial value, and a first difference value that is a difference between a value of the counter at a measurement timing of the time measurement unit and a value of the counter at the setting timing of the initial value;
    a generation unit configured, in response to a power-on instruction, to acquire a second value of the time measurement unit at a predetermined timing corresponding to the power-on instruction, and a second difference value that is a difference between a value of the counter at the measurement timing of the time measurement unit and a value of the counter at the predetermined timing, and to generate a time code concerning an elapsed time from the initial value including a number of frames, based on the initial value, the first value, the first difference value, the second value, and the second difference value; and an output unit configured to output the time code together with a moving image concerning the moving image signal to a display device.

11. The imaging apparatus according to claim 10, wherein the generation unit changes the time code according to a cycle of a frame rate of the moving image signal.

12. The imaging apparatus according to claim 10, further comprising:
   an oscillator configured to generate the clock; and
   a control unit configured to control the imaging apparatus in accordance with the clock generated by the oscillator.

13. The imaging apparatus according to claim 10, wherein the generation unit is configured to calculate a number of elapsed frames, based on a difference between the first difference value and the second difference value, and a value of the counter corresponding to a cycle of a frame rate of the moving image signal.

14. The imaging apparatus according to claim 10, further comprising:
   a setting unit configured to set the initial value of the time code in accordance with an operation from a user.

15. The imaging apparatus according to claim 10, wherein the time measurement unit executes a time measurement operation in a power-off state of the imaging apparatus.

16. The imaging apparatus according to claim 10, wherein the generation unit acquires the second difference value that is a difference between a value of the counter at the measurement timing of the time measurement unit immediately before the predetermined timing and a value of the counter at the instruction timing of the starting display.

17. An imaging apparatus comprising:
   an imaging unit configured to output a moving image signal;
   a time measurement unit configured to measure a current time;
   a counter that counts a clock;
   an acquisition unit configured, in response to setting of an initial value of a time code, to acquire a first value from the time measurement unit at a setting timing of the initial value, and a first difference value that is a difference between a value of the counter at a measurement timing of the time measurement unit and a value of the counter at the setting timing of the initial value;
   a generation unit configured, in response to a predetermined instruction for starting generating a time code, to acquire a second value of the time measurement unit at a predetermined timing corresponding to the predetermined instruction, and a second difference value that is a difference between a value of the counter at the measurement timing of the time measurement unit and a value of the counter at the predetermined timing, and to generate a time code concerning an elapsed time from the initial value including a number of frames, based on the initial value, the first value, the first difference value, the second value, and the second difference value; and
   an output unit configured to output the time code together with a moving image concerning the moving image signal to a display device.

18. The imaging apparatus according to claim 17, wherein the predetermined instruction is an instruction for changing to an imaging mode.

* * * * *